(12) United States Patent
Mullis et al.

(10) Patent No.: US 10,689,882 B2
(45) Date of Patent: *Jun. 23, 2020

(54) TAMPER EVIDENT CARGO CONTAINER SEAL BOLT LOCK

(71) Applicant: NEOLOGY, INC., San Diego, CA (US)

(72) Inventors: Joe Mullis, Oceanside, CA (US); James Robert Kruest, San Diego, CA (US)

(73) Assignee: NEOLOGY, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/202,945

(22) Filed: Nov. 28, 2018

(65) Prior Publication Data

US 2019/0145129 A1    May 16, 2019

Related U.S. Application Data

(63) Continuation of application No. 15/468,588, filed on Mar. 24, 2017, now Pat. No. 10,145,146, which is a
(Continued)

(51) Int. Cl.
  *E05B 39/04*    (2006.01)
  *E05B 17/00*    (2006.01)
  (Continued)

(52) U.S. Cl.
  CPC .............. *E05B 39/04* (2013.01); *B65D 90/22* (2013.01); *E05B 17/00* (2013.01); *E05B 17/22* (2013.01);
  (Continued)

(58) Field of Classification Search
  CPC ............ B65D 2101/00; B65D 2211/00; B65D 90/22; E05B 17/00; E05B 17/22;
  (Continued)

(56) References Cited

U.S. PATENT DOCUMENTS 3,712,655 A    1/1973   Fuehrer
3,810,145 A    5/1974   Gusaras
(Continued)

FOREIGN PATENT DOCUMENTS

DE    69209851 D1         5/1996
DE       29521243 U1   12/1996
(Continued)

OTHER PUBLICATIONS

Extended European Search Report, related to EP Application No. 13764844.0, dated Feb. 24, 2016, (9 pages).

(Continued)

*Primary Examiner* — Omer S Khan
(74) *Attorney, Agent, or Firm* — Procopio, Cory, Hargreaves & Savitch LLP; Mark W. Catanese

(57) ABSTRACT

Systems and methods for a tamper-evident cargo container seal bolt lock are disclosed herein. The device can include a receiving member, a conductive bolt member adapted to be snap-locked into the receiving member, and a plastic encapsulant which tethers the bolt member to the receiving member. The encapsulant can contain an electrically conductive medium, such as a wire, which runs from the receiving member to the second end of the bolt. A sensory circuit disposed within the receiving member can be configured to sense whether the circuit has been interrupted (e.g., if the bolt has been cut). In the event of an interruption, the circuit can record the present time and/or date in memory. An RFID transponder disposed within the encapsulant or the receiving member can then transmit the recorded date/time to an RFID interrogator if a dispute subsequently arises as to when the lock had been broken.

19 Claims, 4 Drawing Sheets

Related U.S. Application Data continuation of application No. 14/841,666, filed on Aug. 31, 2015, now Pat. No. 9,624,692, which is a continuation of application No. 13/791,630, filed on Mar. 8, 2013, now Pat. No. 9,121,195.

(60) Provisional application No. 61/612,906, filed on Mar. 19, 2012.

(51) Int. Cl.
*G06K 19/077* (2006.01)
*B65D 90/22* (2006.01)
*G06F 3/03* (2006.01)
*E05B 17/22* (2006.01)
*E05B 39/00* (2006.01)
*E05B 73/00* (2006.01)
*G07C 1/32* (2006.01)
*E05B 47/00* (2006.01)
*G09F 3/03* (2006.01)

(52) U.S. Cl.
CPC ........ *E05B 39/005* (2013.01); *E05B 73/0017* (2013.01); *G06K 19/07798* (2013.01); *G07C 1/32* (2013.01); *G09F 3/0317* (2013.01); *G09F 3/0329* (2013.01); *H05K 999/99* (2013.01); *B65D 2101/00* (2013.01); *B65D 2211/00* (2013.01); *E05B 2047/0067* (2013.01); *E05B 2047/0072* (2013.01); *E05B 2047/0097* (2013.01); *Y10T 70/625* (2015.04); *Y10T 70/8081* (2015.04); *Y10T 70/8216* (2015.04)

(58) Field of Classification Search
CPC ..... E05B 2047/0067; E05B 2047/0072; E05B 2047/0097; E05B 39/005; E05B 39/04; E05B 73/0017; G06K 19/07798; G07C 1/32; G09F 3/0317; G09F 3/0329; H05K 999/99; Y10T 70/625; Y10T 70/8081; Y10T 70/8216
See application file for complete search history.

(56) References Cited

U.S. PATENT DOCUMENTS

| | | | |
|---|---|---|---|
| 3,824,540 A | 7/1974 | Smith | |
| 5,097,253 A * | 3/1992 | Eschbach | ......... G06K 19/07749 340/545.1 |
| 5,189,396 A | 2/1993 | Stobbe | |
| 5,836,002 A | 11/1998 | Morstein et al. | |
| 6,002,343 A | 12/1999 | Auerbach et al. | |
| 6,069,563 A | 5/2000 | Kadner et al. | |
| 6,265,973 B1 | 7/2001 | Brammall et al. | |
| 6,420,971 B1 * | 7/2002 | Leck | ....................... E05B 39/04 340/542 |
| 6,753,775 B2 | 6/2004 | Auerbach et al. | |
| 6,778,083 B2 | 8/2004 | Auerbach et al. | |
| 6,958,698 B2 | 10/2005 | Maloney | |
| 7,042,354 B2 | 5/2006 | Auerbach et al. | |
| 7,239,238 B2 | 7/2007 | Tester et al. | |
| 7,616,116 B2 | 11/2009 | Ehrensvard et al. | |
| 7,878,561 B2 | 2/2011 | Rietzler | |
| 8,963,712 B2 | 2/2015 | Mullis et al. | |
| 9,121,195 B2 | 9/2015 | Mullis et al. | |
| 9,624,692 B2 | 4/2017 | Mullis et al. | |
| 9,677,300 B2 | 6/2017 | Mullis et al. | |
| 10,119,301 B2 | 11/2018 | Mullis et al. | |
| 2003/0011474 A1 | 1/2003 | Ng | |
| 2003/0052782 A1 * | 3/2003 | Maloney | ............ G08B 21/0288 340/568.4 |
| 2004/0041705 A1 * | 3/2004 | Auerbach | ............... E05B 39/00 340/539.22 |
| 2007/0024066 A1 | 2/2007 | Terry et al. | |
| 2007/0052539 A1 | 3/2007 | Brown | |
| 2007/0120381 A1 | 5/2007 | Ehrensvard et al. | |
| 2007/0194025 A1 | 8/2007 | Tsung et al. | |
| 2007/0256615 A1 | 11/2007 | Delgrosso et al. | |
| 2007/0262850 A1 | 11/2007 | Willgert | |
| 2008/0066502 A1 * | 3/2008 | Sheehan | ............... E05B 45/005 70/49 |
| 2008/0276668 A1 * | 11/2008 | Stachowiak, Jr. | .. E05B 65/0089 70/164 |
| 2008/0295555 A1 | 12/2008 | Chan et al. | |
| 2008/0315596 A1 | 12/2008 | Terry et al. | |
| 2009/0021369 A1 * | 1/2009 | Ulrich | .................. G06Q 10/087 340/539.13 |
| 2009/0115201 A1 | 5/2009 | Terry et al. | |
| 2009/0127873 A1 | 5/2009 | Terry et al. | |
| 2009/0179757 A1 | 7/2009 | Cohn et al. | |
| 2009/0212950 A1 | 8/2009 | Cheng | |
| 2009/0280862 A1 | 11/2009 | Loughlin et al. | |
| 2009/0322510 A1 | 12/2009 | Berger et al. | |
| 2010/0013635 A1 | 1/2010 | Berger et al. | |
| 2010/0253099 A1 | 10/2010 | Navarsky | |
| 2011/0130987 A1 | 6/2011 | Chiu et al. | |
| 2011/0273852 A1 * | 11/2011 | Debrody | ............... G09F 3/0317 361/747 |
| 2015/0048625 A1 * | 2/2015 | Weusten | ............... E05B 47/023 292/137 |

FOREIGN PATENT DOCUMENTS

| | | |
|---|---|---|
| DE | 29813738 U1 | 3/1999 |
| EP | 978812 A2 | 2/2000 |
| EP | 1171330 A1 | 1/2002 |
| GB | 2368174 A | 4/2002 |
| KR | 102011032130 A | 3/2011 |
| WO | 0063052 A1 | 10/2000 |
| WO | 03007221 A2 | 1/2003 |
| WO | 2004053626 A2 | 6/2004 |
| WO | 2013134731 A1 | 9/2013 |
| WO | 2013142104 A1 | 9/2013 |

OTHER PUBLICATIONS

International Search Report and Written Opinion issued in International Patent Application No. PCT/US2013/030035 dated May 29, 2013 (13 pages).
International Preliminary Report on Patentability issued in International Patent Application No. PCT/US2013/030035 dated Sep. 23, 2014 (8 pages).
European Search Report for EP 13758565.9 dated Feb. 22, 2016 (9 pages).
International Search Report received in International Application No. PCT/US2013/030035, dated May 29, 2013, (4 pages).
International Search Report received in International Application No. PCT/US2013/030037, dated May 29, 2013, (4 pages).
International Preliminary Report on Patentability issued in International Application No. PCT/US2013/030037, dated Sep. 9, 2014 (8 pages).
International Preliminary Report on Patentability, dated Sep. 18, 2007, including Written Opinion of the International Searching Authority for International Application No. PCT/DE2005/002282 (7 pages).
International Search Report for International Application No. PCT/DE2005/002282, dated Apr. 20, 2006. (5 pages).

\* cited by examiner

TAMPER EVIDENT CARGO CONTAINER SEAL BOLT LOCK

RELATED APPLICATIONS

This application is a continuation of U.S. application Ser. No. 15/468,588, filed on Mar. 24, 2017 and issued as U.S. Pat. No. 10,145,146, which is a continuation of U.S. application Ser. No. 14/841,666, filed on Aug. 31, 2015, and issued as U.S. Pat. No. 9,624,692, which is a continuation of U.S. application Ser. No. 13/791,630, filed on Mar. 8, 2013 and issued as U.S. Pat. No. 9,121,195, which claims the benefit of priority under 35 U.S.C. 119(e) to U.S. Provisional Application Ser. No. 61/612,906, filed on Mar. 19, 2012, all of which are incorporated herein by reference in their entireties as if set forth in full.

This application is related to U.S. Provisional Application No. 61/609,181, filed Mar. 9, 2012, entitled: "A TAMPER EVIDENT RFID CARGO CONTAINER SEAL BOLT LOCK," which is incorporated herein by reference in its entirety as if set forth in full. This application is also related to U.S. patent application Ser. No. 10/593,046 (now U.S. Pat. No. 7,878,561) filed Sep. 15, 2006, entitled: "SEAL DEVICE," which in turn claims priority as a national stage of International Application No. PCT/DE05/02282 filed Dec. 19, 2005, and entitled "SEALING DEVICE," which in turn claims priority from German Application No. 10 2004 063 487.4 filed Dec. 23, 2004, entitled: "SEALING DEVICE," all of which are incorporated herein by reference in their entireties as if set forth in full.

BACKGROUND

1. Field of the Invention

Various embodiments concern the field of bolt locks for shipping containers. More particularly, various embodiments are directed to intelligent bolt locks which, if tampered with, can report the day and time that they have been tampered with.

2. Related Art

Bolt locks are frequently placed on shipping containers to prevent access to the container's contents by unauthorized parties. A bolt lock can be locked, but it cannot be unlocked—that is to say, when the container finally reaches its intended destination, the bolt has to be split open with bolt cutters in order to access the contents of the container. In this sense, a bolt lock is a one-time use device.

Typically, bolt locks include a metal bolt which is inserted through the hasps of cargo container doors. One end of the bolt includes a head which is substantially large enough to prevent the bolt from sliding out of the hasps in one direction. The other end of the bolt is designed to be inserted into a receiving member. Once the bolt is inserted into the receiving member (which is large enough to prevent the bolt from being slid of the hasps in the other direction), the bolt is then locked into place.

On many occasions, a thief armed with bolt cutters will intercept the shipping container, cut the bolt, and steal the items stored within it. Sometimes, the thief will remove the broken bolt and replace it with a new bolt to make it seem as if no tampering had occurred. A discrepancy between what items were shipped and what items actually arrived will later be discovered in the manifest when the container arrives at its intended destination and its contents are inspected.

In these situations, disputes frequently arise regarding which party or parties are legally responsible for covering the cost of the missing items (e.g., the seller, shipper, purchaser, and/or various insurers). In many instances, the legally responsible party will be predicated upon which party had possession of the container when the theft actually occurred. For example, if the theft occurred after the container was locked, but before the container was provided to the shipper, the missing items are typically the seller's responsibility. If the theft occurred during transit, the missing items can be the shipper's responsibility or its insurer (unless explicitly disclaimed in the contract). If the theft occurred after the shipper delivered the container to the purchaser's storage facility, the missing items are no longer the seller or shipper's responsibility, but rather, it is the purchaser's loss.

However, since the shipping container is usually opened at the end of the delivery chain (i.e., when it finally is in the hands of the purchaser), the theft may have occurred at any time prior to that. By that time, the container has already traveled through multiple locations and has been handled by multiple parties. Usually, visual inspection of the container and/or lock provides no clear evidence as to when or where the theft occurred. With no real way of determining when or where the theft occurred, parties (or their insurers) often find themselves in messy legal disputes, especially if the price of the stolen merchandise is high.

SUMMARY

Systems and methods for a tamper-evident cargo container seal bolt lock are disclosed herein. The device can include a receiving member, a conductive bolt member adapted to be snap-locked into the receiving member, and a plastic encapsulant which tethers the bolt member to the receiving member. The encapsulant can contain an electrically conductive medium, such as a wire, which runs from the receiving member to the second end the bolt. A sensory circuit disposed within the receiving member can be configured to sense whether the circuit has been interrupted (e.g., if the bolt has been cut). In the event of an interruption, the circuit can record the present time and/or date in memory. An RFID transponder disposed within the encapsulant or the receiving member can then transmit the recorded date/time to an RFID interrogator if a dispute subsequently arises as to when the lock had been broken.

In a first exemplary aspect, a bolt lock device is disclosed. In one embodiment, the bolt lock device comprises: a bolt member; a receiving member adapted to receive a first end of the bolt member; an encapsulant connected to the receiving member and to the bolt member, the encapsulant comprising a conductive medium, wherein when the first end of the bolt member has been received in the receiving member, an electrically conductive pathway is formed from the conductive medium, through at least a portion of the bolt member and at least a portion of the receiving member; and a sensory circuit comprising memory, wherein the sensory circuit is adapted to transmit electrical current through the electrically conductive pathway so as to detect whether the circuit has been interrupted, the sensory circuit being further adapted to record the current date and time in the memory in the event of a detected interruption.

In a second exemplary aspect, a method for electronically detecting whether a bolt lock has been tampered with is disclosed. In one embodiment, the method comprises: receiving a first end of a bolt member in a receiving member, the receiving member being connected to the bolt member via an encapsulant comprising a conductive medium, wherein when the first end of the bolt member has been received in the receiving member, an electrically conductive pathway is formed from the conductive medium, through at least a portion of the bolt member and at least a portion of the receiving member; transmitting an electrical current through the electrically conductive pathway; detecting whether the sensory circuit has been interrupted; and in the event of a detected interruption, recording the current date and time in memory.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

The various embodiments mentioned above are described in further detail with reference to the aforementioned figured and the following detailed description of exemplary embodiments.

DETAILED DESCRIPTION

Disclosed is a device and method for aiding with the determination of liability for a theft by knowing when a shipping container had been accessed by an unauthorized party. The device is an alternative to conventional bolt seals or other types of cargo container seals and provides a record of the time of access.

After lading a cargo container with merchandise, the doors of the container are closed and locked. Upon arrival at the final destination, the lock is broken and the cargo removed and inventoried. An unbroken lock provides evidence that the container was not opened during transit. In the event that there is a discrepancy in the manifest between what items were sent and what items were received, a transponder disposed within in the lock can be queried using a suitable reader to determine whether a tamper event was recorded. If a tamper event was recorded, the date and time of the event can then be transmitted to the reader. The date and time of the tamper event makes it substantially easier to determine which party was in possession of the cargo container when the tamper event occurred (and consequently, which party is legally responsible for covering the loss).

Note that the transponder can be repeatedly queried while the container is en route, particularly each time possession of the cargo container changes hands. This process can assist law enforcement since theft can be discovered more immediately (rather than, for example, being discovered upon ultimate delivery to the purchaser, which is sometimes weeks after the day that the theft occurred).

According to various embodiments, the bolt lock device includes a bolt member and a receiving member. The bolt member is intended to be inserted through one or more hasps, with one end of the bolt member being inserted into the receiving member.

Figure 1A:
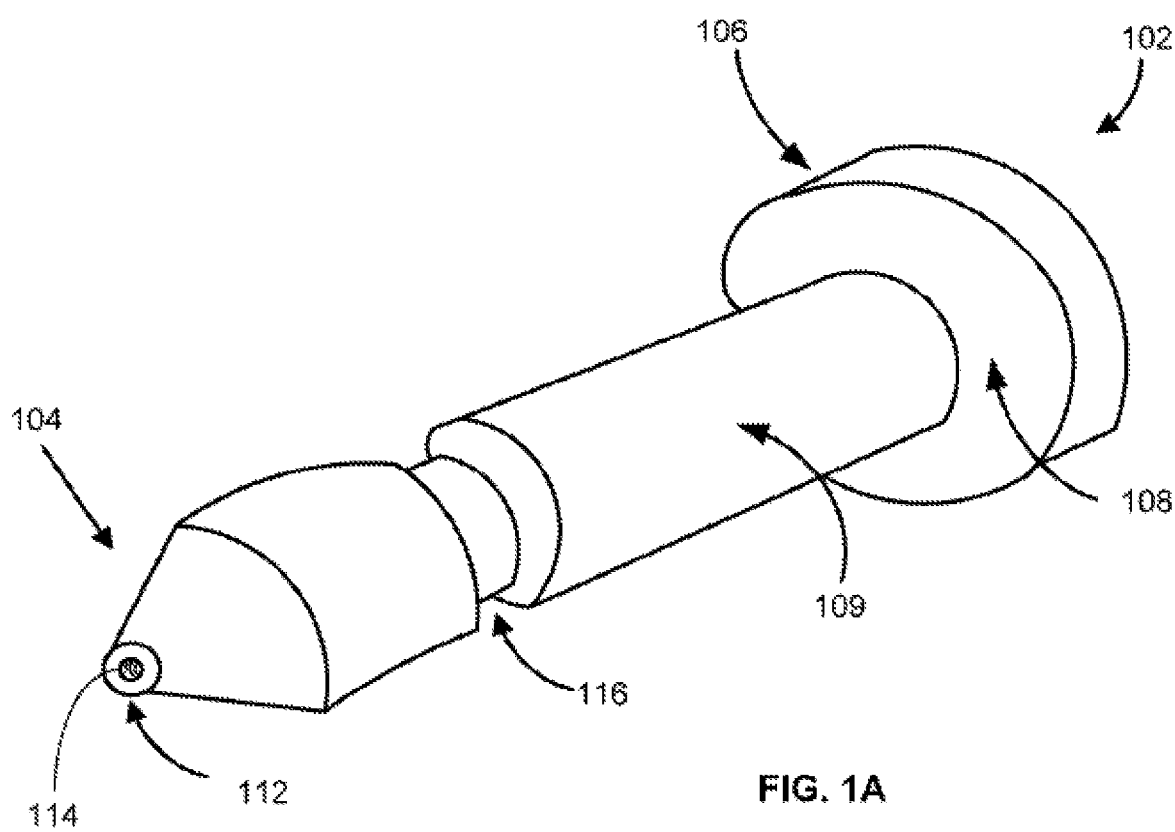
FIG. 1A is a perspective view of an exemplary bolt member according to one embodiment.

FIG. 1A is a perspective view of an exemplary bolt member according to one embodiment. The bolt member 102 can be made of metal or some other material. As shown by this figure, bolt member 102 can have a first end 104 adapted for insertion into a receiving member 202 (shown in FIG. 2), and a lock groove 116 for locking the bolt member 102 to the receiving member 202. The second end 106 of the bolt member 102 can form a head 108 which is substantially larger than the diameter of the hasps of cargo container doors (not shown) and therefore also substantially larger than the diameter of the shaft 109 of the bolt. The head 108 can thus serve to prevent the bolt member 102 from sliding through the hasps of the cargo container door in a first direction.

Figure 1B:
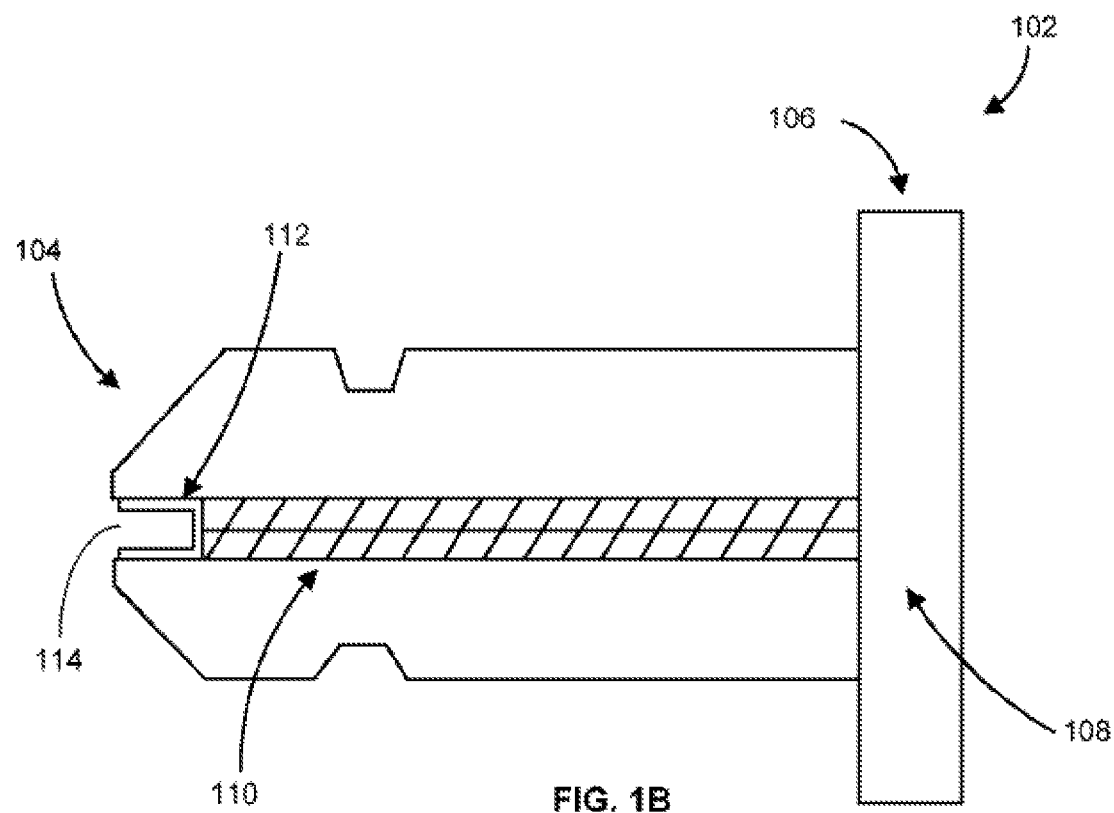
FIG. 1B is a cross-sectional view of the exemplary bolt member depicted in FIG. 1A.

FIG. 1B is a cross-sectional view of the exemplary bolt member depicted in FIG. 1A. As shown by this figure, the bolt member 102 can have a conductive center 110 running the axial length of the bolt. The conductive center 110 can be made of the same material as the structural part of the bolt (e.g., metallic), or it can be made of a different material. In some embodiments, the conductive center 110 can consist of conductive wiring.

According to some embodiments, the conductive center 110 can be electrically insulated from the structural portion of the bolt. An insulated core within which the conductive center lies can have a small diameter to minimize degradation in the physical strength of the structural part of the bolt member 102. In some embodiments, the conductive center 110 can be surrounded with a second material having electrically insulating material or dielectric properties.

Figure 2:
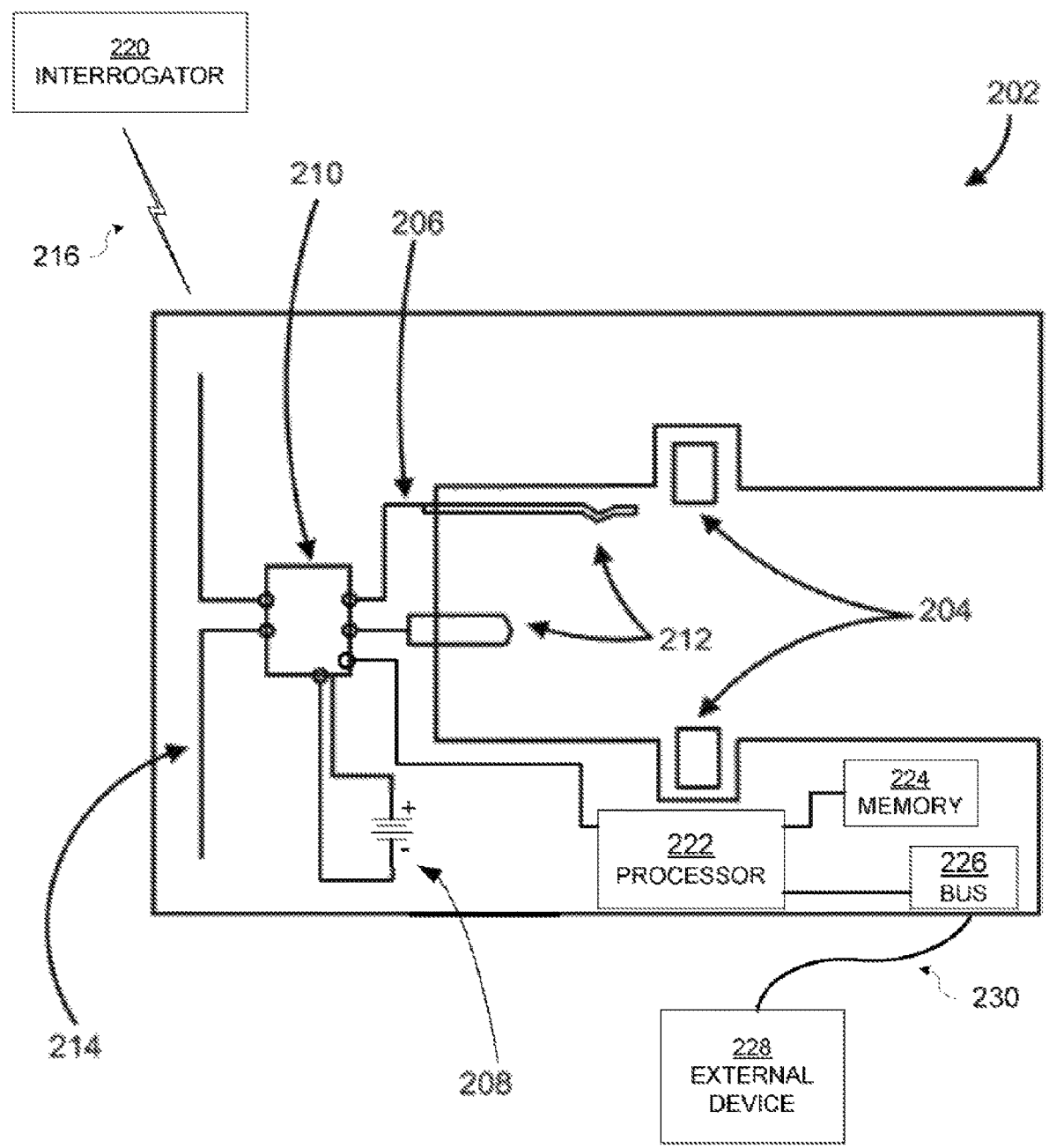
FIG. 2 is a cross-sectional view of an exemplary receiving member according to one embodiment.

At the first end 104 of the bolt member 102, the conductive center 110 can be adapted to interface with one or more electrical contacts 212 of a circuit 206 disposed within a receiving member 202 (shown in FIG. 2). For example, in some embodiments, pin connector 112 can be a female connector adapted to receive one or more pins through a pin connector opening 114 positioned at the first end 104 of the bolt member 102.

At the second end 106 of the bolt member 102, the conductive center 110 can terminate at the head 108 and form a conductive pathway through metal in the head 108 and metal in the shaft 109 in order to complete the circuit. In other embodiments, the conductor 110 can simply wrap backwards upon itself after it has traversed the length of the bolt member 102.

Note that while several embodiments (such as the one depicted in FIG. 1B) include a conductor or conductive material 110 running through the center of the bolt member 102, the conductor or conductive material need not necessarily run through the center of the bolt member 102, but can be positioned differently in other embodiments. For example, the conductor or conductive material can be radially offset by some distance from the center of the shaft 109, including, for example, being positioned at a radial edge of shaft 109. Also, according to some embodiments, the conductor or conductive material can run through multiple locations of the bolt member 102.

FIG. 2 is a cross sectional view of an exemplary receiving member according to one embodiment. The receiving member 202 can be configured to receive the bolt member 102 inserted therein and prevent its withdrawal, thereby locking it into place. In some embodiments, lock ring 204 disposed within the receiving member 202 is adapted to interface with lock groove 116 (shown in FIG. 1A) in order to facilitate the locking.

Receiving member 202 can include a circuit 206 adapted to interface with conductive center 110 (shown in FIG. 1B) via a set of electrical contacts 212. In some embodiments, for example, electrical contacts 212 can include a set of connectors, such as one or more mating pins adapted to be inserted with pin connector 112 of the bolt member 102. Instead of mating pins, note that other types of electrical contacts 212 can be used in the alternative.

Thus, the first end 104 of the bolt member 102 can be shaped specifically to facilitate its insertion into the receiving member 202, and to electrically interface with one or more electrical contacts 212 formed in the receiving member 202. In some embodiments, when the first end 104 of the bolt member 102 is inserted into the receiving member 202, a continuous circuit is formed from one electrical contact 212 through the conductive center 110, across length of the bolt member 102, up to its head 108, returning through the metal material of which the bolt is made, and then back to a second electrical contact 212.

In some embodiments, the circuit 206 can be a sensory circuit configured to sense whether the circuit is continuous or has been interrupted (i.e., whether it is a "short" or "open" circuit). Thus, if the conductive center 110 running the axial length of the bolt member 102 has been severed (for example, if bolt member 102 has been cut with bolt cutters) the circuit 206 can therefore detect this condition. Persons skilled in the art will appreciate that circuit 206 can be designed in a number of different manners and/or circuit arrangements in order to accomplish this purpose.

In order to provide power to the circuit 206, a battery 208 can be molded or otherwise included in the receiving member 202. This battery 208 can be used in order to enable operations of timekeeping, event and data logging, and other functions. Batteries 208 of any type can be used for this purpose, such as button or coin cells, or thin-film batteries. In some embodiments, the receiving member 202 can be configured to connect the battery 208 to the circuit 206 only when the bolt is inserted, i.e. when the container is sealed, in order to maintain battery charge while on the shelf.

The circuit 206 can also include a processor 222, memory 224, and a timing circuit or clock (not shown), the latter component for keeping track of the current date and/or time. Thus, according to some embodiments, when the circuit 206 is detected to be opened or shorted, the present date and/or time can be written to memory 224. This serves as evidence as to when the tamper event occurred. In some embodiments, the memory 224 can also store a transaction record of intermediate events that occurred during the course of travel or shipment, such as times and places of transfers. This information can further assist in pinpointing the exact location of the shipping container when the tamper event occurred.

In some embodiments, the state of the condition of the circuit 206 (i.e., whether the circuit has been shorted or opened) can be polled at periodic intervals in order to extend the operational life of battery 208. For example, in some embodiments, a polling event can take place every five minutes. The regularity of polling can be adjusted to correspond with the operational life of the battery 208 and/or the total expected time of delivery of the shipment.

In some embodiments, the circuit 206 can also include a transponder 210 and an antenna 214. The transponder 210 can comprise a single chip, or a combination of chips and components forming a wireless communication means. In one embodiment, for example, the chip is an RFID chip operating in the UHF frequency band and complying with the ISO 18000-6C or EPC C1G2 standard. Other chips can also be applied, including those operating in the HF frequency band and compliant with ISO 14443A/B or ISO 15693, Bluetooth, Zigbee, or proprietary technologies. In some embodiments, electrical contacts 212 can connect with contact pins which are part of the transponder 210.

The transponder 210 can be connected to antenna 214, which serves to receive and transmit signals 216 to a reader or interrogator 220. The one or more batteries 208 can be used to power the transponder, either continuously or intermittently.

In some embodiments, the transponder 210 can contain a unique identifier and other information related to the nature of the shipment and its contents. This data can be stored in a memory module local to the transponder 210 or in another memory source associated with circuit 206.

In other embodiments, a serial or parallel bus connection 226, rather than a wireless transponder, can be used to read/write data to memory 224 of the circuit 206. For example, a USB, FireWire, or RS-232 port can be included within receiving member 202. If an arrival time and location is to be written to the memory 224 of the circuit 206 (for example, when the shipping container is being transferred from ship to train), a handheld device 228 with a connecting serial bus cable 230 can transmit the data to be written through the serial bus cable to the memory 224. Conversely, if the contents of the memory 224 are queried in order to determine if a tamper event occurred, the requested data can be transmitted from memory 224 of the circuit 206 over the serial cable to the querying device.

Figure 3:
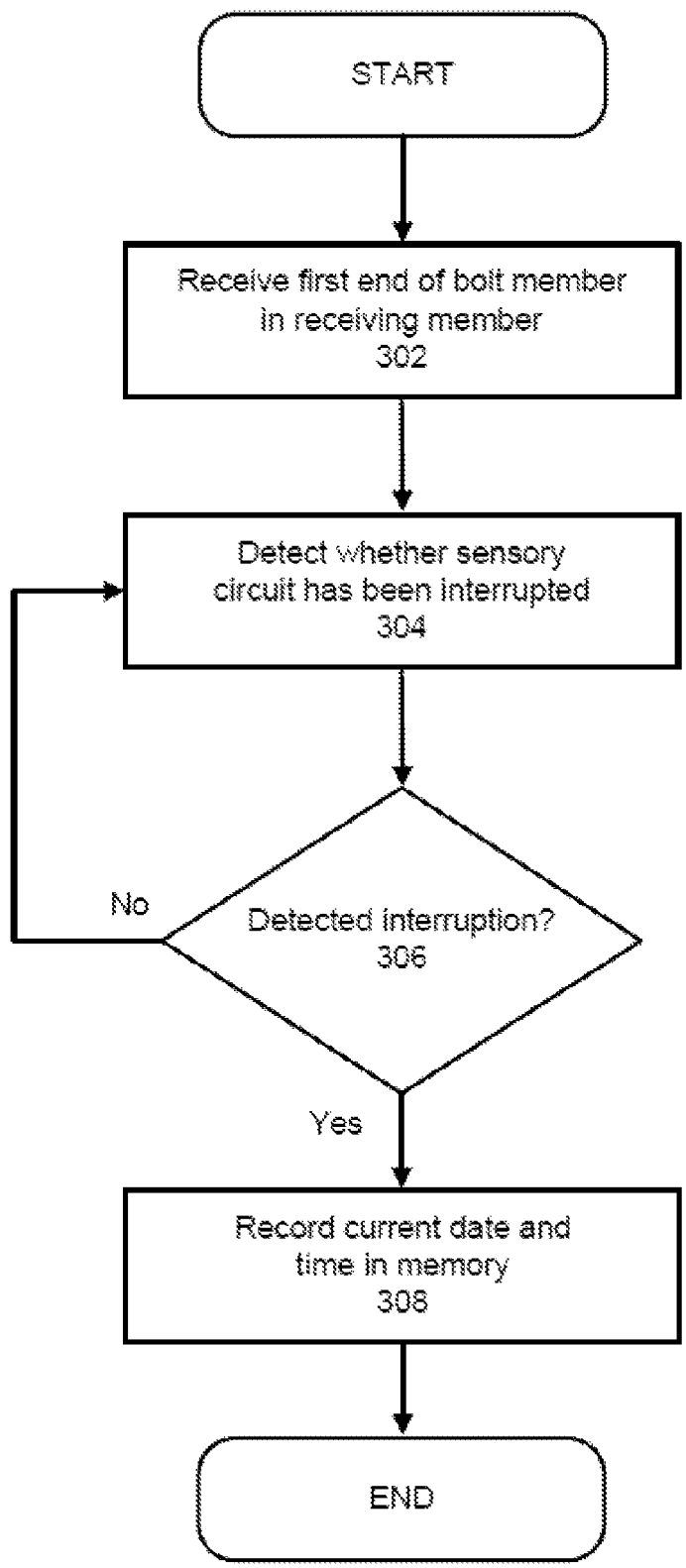
FIG. 3 is a flow diagram illustrating an exemplary method of electronically detecting whether a bolt lock has been tampered with according to one embodiment.

FIG. 3 is a flow diagram illustrating an exemplary method of electronically detecting whether a bolt lock has been tampered with according to one embodiment.

At block 302, a first end of a bolt member is received in a receiving member. The first end of the bolt member can be specifically shaped for insertion into the receiving member, such that the bolt member can be locked in the receiving member upon or after insertion. A sensory circuit disposed within the receiving member can be adapted to electrically interface with a conductive medium running the axial length of the bolt member. For example, one or more mating pins can electrically interface with a female pin connector through a pin connector opening at a first end of the bolt member.

When the circuit is connected to a power source, such as a battery, electrical current can then run from a first mating pin through the axial length of the bolt and back to a second mating pin in order to form a continuous circuit. If the circuit is severed (for example, the bolt is cut), the circuit can then detect an interruption (e.g., an open or short circuit). This condition can be checked continually or periodically according to various embodiments. Blocks 304 and 306 depict this process.

In the event of a detected interruption, then at block 308, the present date and time can be written to a local memory module. This data serves as evidence as to when the tamper event occurred. Optionally, the data stored within this memory can subsequently be transmitted to an external device 220 in response to a query transmitted from a wireless transceiver (e.g., an RFID interrogator) or over a serial bus cable.

In some embodiments, the memory 224 of the bolt lock device can be written to as well. These write operations can be used, for example, in tracking a container as it is shipped through multiple locations and/or as the container is transferred between multiple parties. By periodically writing to the memory 224 of the bolt lock device as the device changes locations and/or handling parties, a location log and date-stamp can be generated to facilitate more immediate discoveries of tamper events. In this manner, tamper events can be discovered well before the shipping container arrives at its intended destination.

In order to facilitate a simpler assembly of the bolt lock device and to improve the strength and/or structural integrity of the bolt member, various alternative embodiments of the bolt lock device are described below. Note that these embodiments can also have the advantage of costing less to manufacture, thereby decreasing the sales price of the finished product.

Figure 4:
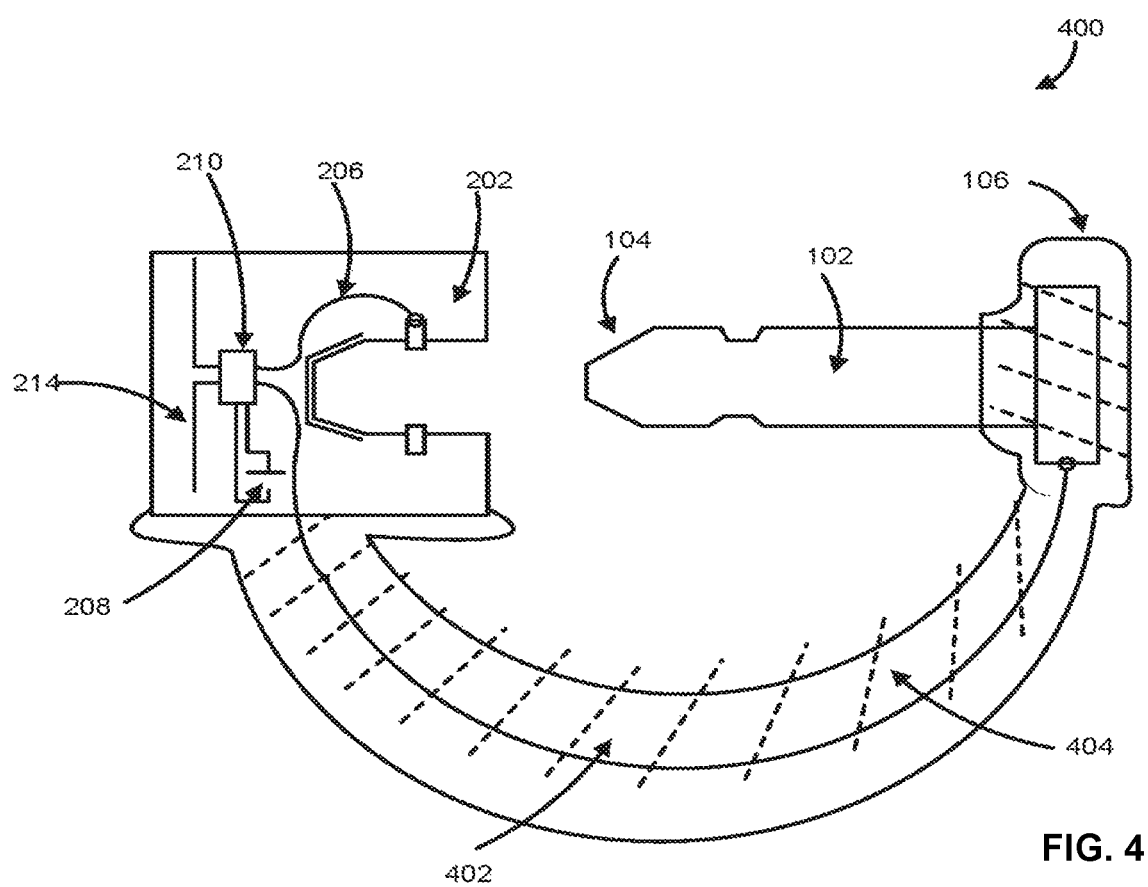
FIG. 4 is a cross-sectional view of an exemplary bolt lock device with sensory circuit components disposed within the receiving member according to one embodiment.

FIG. 4 is a cross-sectional view of an exemplary bolt lock device with sensory circuit components disposed within the receiving member according to one embodiment. As shown by this figure, exemplary bolt lock device 400 can include a bolt member 102, a receiving member 202, and an encapsulant 402 connected to both the bolt member 102 and the receiving member 202. In effect, the receiving member 202 and the bolt member 102 are tethered to each other by the encapsulant 402. This has the further advantage that the bolt lock device 400 is a single unit rather than two parts which may become separated, lost, or accidentally switched with a similar component from a different bolt lock device 400.

In the embodiment depicted by FIG. 4, many of the components of the sensory circuit 206 are contained within the receiving member 202. This may include, for example, a transponder 210, an antenna 214, and one or more batteries 208. Note that a serial bus interface (e.g., USB, Firewire, RS-232, etc.) can be used in addition to or in lieu of transponder 210 and antenna 214 according to some embodiments.

In the embodiment depicted by FIG. 4, a portion of the electrical loop which detects tampering can be partly external to the bolt member 102 and the receiving member 202, formed within an encapsulating material. This encapsulant 402 can be made of flexible and durable material, such as certain plastics. A circuit wire 404 or other conductive medium can be routed from a part of the circuit 206 disposed within the receiving member 202 through the encapsulant 402 and connect electrically and/or mechanically with the second end 106 of the bolt member 102 (for example, it can connect with the head 108 of the bolt member 102, see FIG. 1A).

Rather than running an electrical wire or separate conductive medium through an electrically insulated region in the bolt member 102 (for example, through an insulated core extending axially across the length of the bolt), the bolt member 102 can have a solid interior according to some embodiments. This simplifies manufacture as the bolt member 102 does not require special processing in order to ensure that there is an adequate opening for a separate conductive medium. Instead, the structural portion of the bolt member 102 can itself serve to conduct electrical current in a single direction.

Thus, when the bolt member 102 has been received in the receiving member 202, an electrically conductive pathway can be formed from a first connecting pad (or pin) of the transponder 210, through an external wire 404 in the encapsulant 402, to the second end 106 of the bolt member 102, and return to a second connecting pad (or pin) of the transponder 210. Electrical continuity between the bolt member 102 and the second connecting pad (or pin) of the transponder 210 can be formed by a connection to a spring contact, or alternatively, to the lock retaining ring 204 (see FIG. 2) that is part of the receiving member 202. Thus, when the bolt member 102 has been received in the receiving member 202, a continuous electrical circuit is formed.

As in the previous examples, the transponder 210 can comprise a single chip, or a combination of chips and components forming a wireless communication means. In one embodiment, for example, the chip is an RFID chip operating in the UHF frequency band and complying with the ISO 18000-6C or EPC C1G2 standard. Other chips can also be applied, including those operating in the HF frequency band and compliant with ISO 14443A/B or ISO 15693, Bluetooth, Zigbee, or proprietary technologies.

Figure 5:
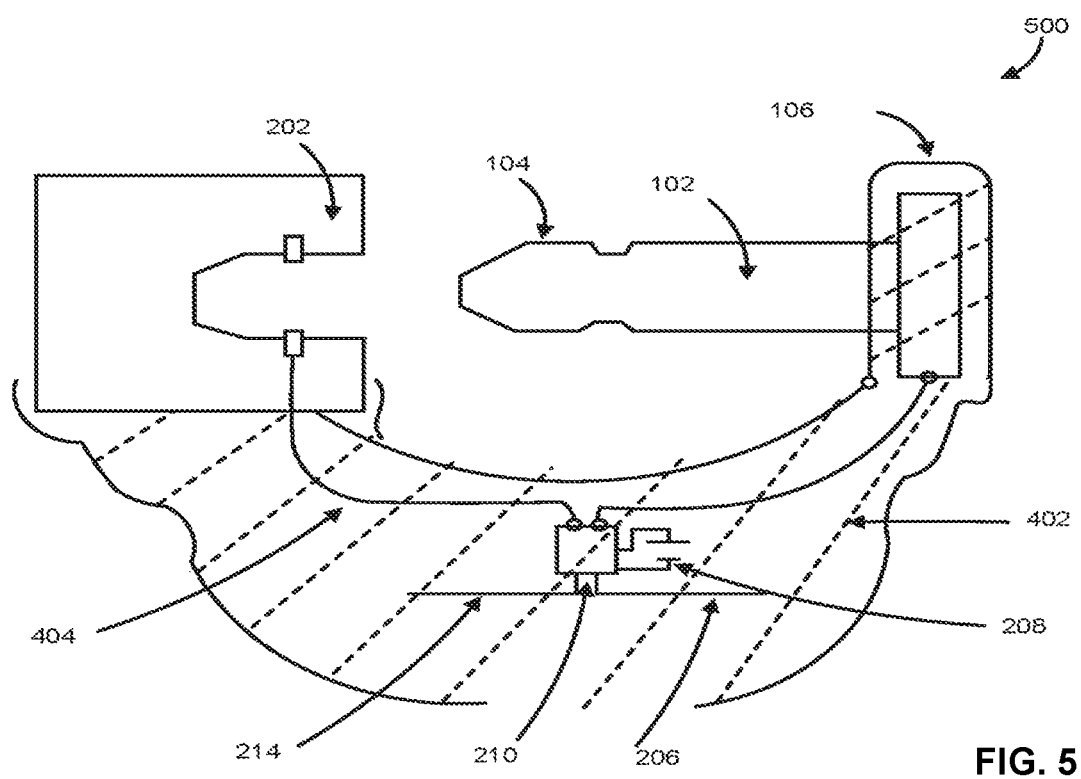
FIG. 5 is a cross-sectional view of an exemplary bolt lock device with sensory circuit components disposed within the encapsulant according to one embodiment.

FIG. 5 is a cross-sectional view of an exemplary bolt lock device with sensory circuit components disposed within the encapsulant according to one embodiment. As shown by FIG. 5, exemplary bolt lock device 500 can be structured and arranged similarly to exemplary bolt lock device 400 of FIG. 4, except that the components of the circuit 206 (e.g., the transponder 210, the battery 208, and the antenna 214) can be disposed within the flexible "tether" encapsulant 402 which connects the receiving member 202 to the bolt member 102. This configuration can simplify the construction and assembly of the receiving member 202, as it is significantly easier to place the transponder 210, antenna 214, battery 208, and connections to the loop wire 404 in the encapsulant 402 than to assemble the components in the body of the receiving member 202. These circuit components can be made flexible or rigid as required, preassembled onto a substrate, and encapsulated as a unit according to some embodiments. A number of methods for encapsulation may be used for this purpose (for example, over-molding).

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A lock device comprising:
   a bolt member having a first end and a second end;
   a receiving member configured to receive first end of the bolt member;
   an encapsulant having a first end physically connected to the receiving member and a second end physically connected to the second end of the bolt member;
   a sensory circuit disposed within the encapsulant and between the first and second ends of the encapsulant and configured to form a continuous electrical pathway that electrically connects the bolt member and the receiving member, wherein the sensory circuit is configured to detect an interruption of the continuous electrical pathway;
   a conductive medium disposed within the encapsulant that connects the receiving member to the second end of the bolt member, wherein, within the encapsulant, the sensory circuit is coupled to the conductive medium, wherein the electrically conductive pathway is formed from the conductive medium and the sensory circuit when the first end of the bolt member is received by the receiving member; and
   a communication circuit coupled to the sensory circuit and configured to transmit data indicative of the detected interruption.

2. The lock device of claim 1, further comprising a memory configured to store the data indicative of the detected interruption in response to detecting the interruption.

3. The lock device of claim 1, wherein the data comprises at least a date and a time of the interruption.

4. The lock device of claim 1, wherein the communication circuit is configured to transmit the data indicative of the interruption in response to a query.

5. The lock device of claim 4, wherein the sensory circuit is configured to store a unique identifier associated with the lock device, and the communication circuit is further configured to transmit the identifier in response to the query.

6. The lock device of claim 4, wherein the sensory circuit is configured to store information with respect to at least one of a nature of a shipment or one or more contents of the shipment, and the communication circuit is further configured to transmit at least a portion of the information in response to the query.

7. The lock device of claim 4, wherein the sensory circuit is configured to store a unique identifier associated with the lock device and periodically receive and store information related to multiple transit locations and/or multiple handling parties of a container comprising the lock device to create a log, and the communication circuit is further configured to transmit the identifier and the log in response to the query.

8. The lock device of claim 1, wherein the communication circuit comprise transponder including a radio frequency identification (RFID) chip and an antenna, and wherein the transponder is configured to transmit the data indicative of the detected interruption over a wireless connection.

9. The lock device of claim 1, wherein the communication circuit comprises a serial bus configured to transmit the data indicative of the detected interruption over a wired connection.

10. The lock device of claim 1, wherein the sensory circuit is adapted to detect that the continuous pathway is shorted.

11. The lock device of claim 1, wherein the sensory circuit is adapted to detect that the continuous pathway is open.

12. The lock device of claim 1, wherein the continuous electrical pathway is formed in response to the receiving member receiving the bolt member.

13. The lock device of claim 11, wherein the encapsulant is configured to tether the bolt member to the receiving member and comprises an electrically conductive medium connected to receiving member and the bolt member.

14. A method comprising:
   detecting an interruption of a continuous electrical pathway electrically connected to a second end of a bolt member and a receiving member configured to receive a first end of the bolt member, the continuous electrical pathway electrically formed from a conductive medium and a sensory circuit when the first end of the bolt member is received by the receiving member, the sensory circuit disposed within an encapsulant connected to the receiving member and the second end of the bolt member and disposed between a first end of the encapsulant physically connected to the receiving member and a second end of the encapsulant physically connected to the second end of the bolt member, the conductive medium disposed within the encapsulant and connects the receiving member to the second end of the bolt member, and the sensory circuit is coupled to the conductive medium within the encapsulant; and
   transmitting data indicative of the interruption.

15. The method of claim 14, storing, in a memory, the data indicative of the detected interruption in response to detecting the interruption.

16. The method of claim 14, further comprising transmitting the data indicative of the interruption in response to a query.

17. The method of claim 15, further comprising:
   storing a unique identifier associated with the sensory circuit, and
   transmitting the identifier in response to the query.

18. The method of claim 15, further comprising:
   storing information with respect to at least one of the following: a nature of a shipment, or one or more contents of the shipment, and
   transmitting at least a portion of the information in response to the query.

19. The method of claim 15, further comprising:
   storing a unique identifier associated with the lock device;
   periodically receiving and storing information related to multiple transit locations and/or multiple handling parties of a container comprising the lock device to create a log; and
   transmitting the identifier and the log in response to the query.

* * * * *